April 1, 1958          M. M. ARLIN          2,828,873

MATERIAL FLOW CONTROL SYSTEM

Filed Jan. 7, 1957          4 Sheets-Sheet 2

FIG 6

*INVENTOR.*
MAX M. ARLIN
BY

AGENT

FIG 8

United States Patent Office

2,828,873
Patented Apr. 1, 1958

2,828,873

MATERIAL FLOW CONTROL SYSTEM

Max M. Arlin, Huntington Woods, Mich.

Application January 7, 1957, Serial No. 632,702

7 Claims. (Cl. 214—16)

This invention relates to material handling systems and more particularly to a system for continuously feeding parts directly from the machine that produces them to a plurality of machines that use them in assembly operations.

Automatic continuous assembly machines require a constantly operative source of parts that are to be assembled. These parts must be continually available and they must often be fed to the machine in particular oriented positions. Fully automatic factories require systems for removing these parts directly from the machine that produces them and for feeding them to the machines that utilize them. Since the producing machines very often operate at some rate other than that of the parts consuming machine it is necessary to provide an intermediate storage system which will receive the parts from the producing machine and store them and feed them to the consuming machine as they are required.

It is also desirable that this storage system should have relatively a large capacity so that it may feed the parts to the consuming machines at such times as the producing machines are inoperative for normal reasons such as retooling or minor repair. If the storage system merely removed the parts from the producing machines and fed them directly to the consuming machines the entire factory would have to be shut down whenever any one machine was shut down. This combination inter-machine storage and feeding concept has been termed "segmented automation." It allows the factory which largely consists of automatic machinery to produce a relatively constant output even when individual units are occasionally shut down.

Since one producing machine must often feed a plurality of parts consuming machines in automatic operations it is additionally necessary to provide means for assuring that all of the consuming machines are receiving their normal parts requirement.

In order to achieve the above objectives the present invention contemplates the use of individual storage units at each of the consuming machines and one or more larger storage units which may receive the parts from the producing machine and constantly allocate these parts to each of the consuming machines as the individual machines require such. The invention also provides a series of logical circuits which operate in combination with sensing devices to feed the storage unit parts as they deliver them to the machines.

It is therefore, an object of the present invention to provide conveying means for delivering work pieces to a plurality of production machines.

It is a further object of the present invention to provide a continuous automatic material feeding system for production machinery that also operates as a storage reservoir for components produced at other production machines.

Another object of the present invention is to provide a material flow system for automatic machinery that is controlled by the quantity of work pieces stored in various reservoirs of the system.

Another object of the present invention is to provide an electronic, logical, control system for controlling the storage and feeding of work pieces to a plurality of production machines.

A further object is to provide a logical control system for a material handling system which utilizes the principles of cybernetic control in order to feed parts to a plurality of machines in accordance with their various consumption rates.

A further object is to provide a system having the foregoing features which is dependable in operation and simple of maintenance.

In one preferred embodiment the present invention takes the form of a plurality of work piece feeding hoppers disposed adjacent to a plurality of automatic assembly machines; primary storage units for the work pieces; conveying equipment operative between the primary storage units and the hoppers; and means for controlling the flow from the primary storage units to the hoppers in accordance with the rate of removal of the work pieces from the hoppers to the machines. The preferred system also includes a main storage unit for receiving the work pieces from the machine in which they are produced; a conveying system operative between this main storage unit and the plurality of primary storage units and means for controlling the flow from the main storage unit to the primary storage units in accordance with the rate of withdrawal of the work pieces from the primary units.

The electronic logical control which also forms a part of the present invention takes the form of sensing elements for detecting the quantity of parts maintained in the various storage units and hoppers; electronic time delay circuits for controlling the amount of feed to a particular hopper; and relay systems for controlling the particular hopper to be fed and the conveying means for feeding.

Other objects, advantages, and applications of the present invention will be made apparent in the following detailed description of an embodiment of the invention. The description makes reference to the accompanying drawings in which.

Figures 1, 2, 3, 4, 5:
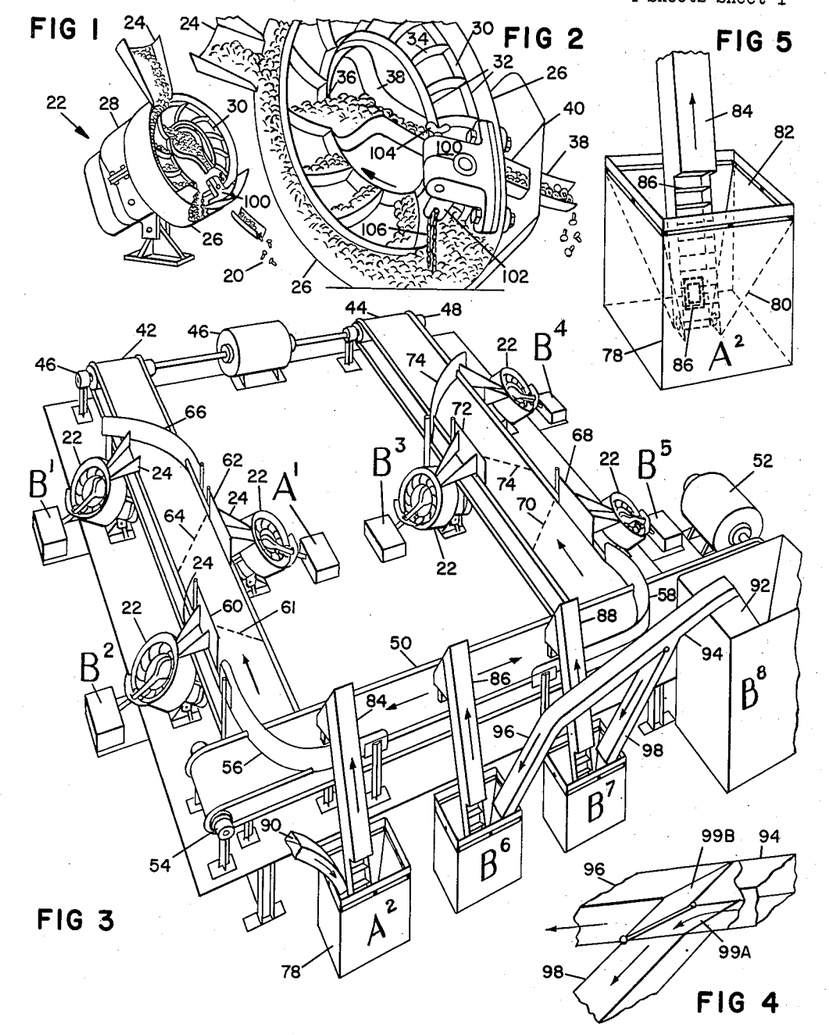
Figure 1 is a perspective view of a rotary hopper of the type that is associated with each of the production machines to be serviced.
Figure 2 is a detailed view of the mechanism of the hopper shown in Figure 1.
Figure 3 is a perspective representation of an entire material handling system which embodies the present invention.
Figure 4 is a detailed cross-section of one of the elements shown in Figure 3.
Figure 5 is a perspective view of one of the four hoppers utilized in the preferred embodiment of this system.

Referring to Figure 3, each of the boxes B1, B2, B3, B4, B5 and A1 represents a production machine. The machine may be of any automatic variety which requires a constantly operative source of the work pieces handled by the system, such as the rivets 20 (Figure 1).

It is to be understood that the scope of the present invention is to be limited neither by the size nor shape of the work pieces to be handled or by the exact nature of the machine to be serviced. The work pieces 20 are to be fed to the machines B1, B2, B3, B4, and B5. Another work piece which may, but need not be of a similar configuration to the rivets 20, is to be fed to the machine A1. The original source of all the work pieces 20 which are to be fed to the B machines is the floor hopper B8. The source within the system of the work pieces that are to be fed to machine A1 is the storage hopper A2.

The requirements of the system are that having received sufficient quantities of work pieces in the floor hopper B8 and the storage hopper A2, the machine will feed these parts to the respective machines which require them at rates which are commensurate with the machines' production requirements. In addition, the system must provide a storage reservoir for the parts. In other words, the rate of introduction of the parts to the hoppers B8 and A2 will sometimes be much greater and at other times much less than the rates of consumption of the parts by the machines being serviced.

Each of the machines B1, B3, B4, B5 and A1 is immediately serviced by a rotary hopper 22, one of which is shown in detail in Figure 1. The hopper 22 is a type which is old in the art and is commercially available. Although a rotary type hopper is shown a vibratory hopper might be used in similar systems. The hopper 22 includes an input runway 24 which feeds work pieces 20 into the main bowl 26 of the hopper. An electric motor 28 continuously rotates a dipper mechanism 30 which consists of an annular plate having side walls 32 on its inner and outer diameters, and a plurality of bowed dipper elements 34 radially disposed at regular intervals between the inner and outer walls 32.

The control circuit for the system as will be described later operates in such a manner as to maintain a sufficient quantity of parts 20 in the bowl 26 so that when the dipper mechanism 30 rotates through the bowl the dipper elements 34 pick up a certain approximate number of the work pieces 20. As the dipper mechanism 30 reaches a high point in its rotation it passes a point where the wall 32 on its inner diameter is broken at 36. The force of gravity then causes the work pieces 20 to flow from the particular dipper pocket into a guideway 38 which carries the parts through a guide number 40 (the guideway 38 being shown in a cutaway attitude in Figure 1 so as to allow other details of the hopper 22 to be shown). In certain applications the guide member 40 may serve to orient the parts that pass through it. In the particular application being described such orientation is not necessary.

Each of the hoppers 22 is disposed between the machine which it services and a conveyor belt. The hoppers servicing machines B1, B2 and A1 are disposed adjacent to a conveyor line 42 while those hoppers 22 which service B3, B4 and B5 are disposed adjacent to a conveyor belt 44. Both of the conveyor belts 42 and 44 are powered by the single electric motor 46 which rotates in such a direction as to move the top surfacing of the conveyor belts 42 and 44 along in the directions indicated by the arrows in Figure 3. One end of the conveyor belt 44 is formed about a bearing 48. Each of the conveyor belts has similar bearings at its opposite end (not shown).

At their input ends each of the conveyors 42 and 44 is mounted adjacent to a conveyor 50 which runs perpendicular to both of them. The conveyor 50 is powered by a motor 52 which may be rotated in either direction so as to cause the conveyor 50 to move in the direction of either of the arrows shown in Figure 3. At one of its ends the conveyor 50 is formed on a bearing 54 and another bearing is also disposed at its other end (not shown). Rounded guide numbers 56 and 58 are disposed on the top of the conveyor 50 at each of its ends and are so disposed as to cause parts being moved along the conveyor 50 to be routed on to the conveyor 42 or the conveyor 44 depending upon the direction which the conveyor 50 is moving as a result of the rotation of the motor 52.

Gates are also disposed adjacent to each of the rotary hoppers 22 so as to cause parts moving down their particular conveyor belt 42 or 44 to move into their hopper 22 when opened. The gate 60 which is positioned adjacent to the hopper 22 servicing the machine B2, causes parts moving down the conveyor 42 to be guided into the input funnel 24 of its hopper when the gate 60 is in open position as indicated by the dotted line 61. When the gate 60 is in a closed position it allows parts moving down conveyor 32 to proceed to the gate 62 which is positioned adjacent to the hopper 22 servicing machine A1. When the gate 62 is in an open position, indicated by the dotted line 64, parts moving down the conveyor 42 are diverted into the funnel 24 of that hopper. Parts which pass both the gates 60 and 62 are diverted by a guide number 66 into the input channel 24 of the hopper 22 which services machine B1.

A similar arrangement exists along the conveyor belt 44. When the gate 68 is in an open position 70 it diverts parts into the hopper 22 which feeds machine B5. When the gate 72 is in an open position 74 it feeds parts to hopper 22 feeding machine B3. Parts which pass both the gates 68 and 72 are diverted by guide number 74 into the hopper 22 which feeds machine B4. The control on all of the gates 60, 62, 68 and 72 is such that only one of the gates may be in an open position at any time (as will be subsequently described).

This conveyor and gating arrangement makes it possible to convey work pieces which are dropped on to the conveyor 50 to the hoppers servicing any one of the machines, simply by controlling direction of the motor 52 and by opening one of the gates associated with the individual machine.

The storage hoppers A2, B6 and B7 are so constructed as to store parts and to feed them through the conveyor belt 50 when properly actuated. The detailed construction of the hoppers A2, B6 and B7 are exactly the same. Therefore, a detailed description of one will suffice for them all. The details of their construction are shown in Figure 5. The hoppers comprise a steel rectangular number 78 which has inverted conical inside numbers 80 which taper towards the bottom. Work pieces introduced at the top opening 82 of the hopper are therefore gravity fed to the bottom of the hopper. A motor driven elevator 84 which contains a plurality of horizontal slots 86 at regular intervals along its vertical length acts to lift parts at a regular rate out of the bottom of the hopper and carry them to the top of the elevator from which they drop on to the conveyor 50. A small electrically conducted plate 86 is mounted on one of the inside mechanical numbers 80 in an insulated relationship with respect to the base 78. This plate is used to detect the presence of a minimum quantity of parts in the hopper 78.

The elevators 86 and 88 of the hoppers B6 and B7 respectively also feed parts onto the conveyor 50. The hopper A2 is fed from a source 90 which may be supplied from the machine that produces the work pieces fed by the hopper A2. The storage hoppers B6 and B7 may be fed from a floor hopper B8 which has a larger volume than the storage hoppers B6 and B7 and which receive parts directly from the producing machine (not shown). An elevator mechanism 92 in the hopper B8 feeds the work pieces to the hoppers B6 and B7 through conduit 94 which forks into two branches 96 and 98. The branch 96 feeds to the storage hopper B6 while the branch 98 feeds to the storage hopper B7.

The mechanism by which parts are routed into either branch 96 or 98 from the conduit 94 is shown in detail in Figure 4. A hinged door 99 is mounted so that it normally lies in a position 99–A, covering the opening to the branch 98 and directs parts to the branch 96. However, when the control circuit which will be subsequently described provides an appropriate signal, an actuator (not shown) lifts the plate 99 to a position 99B wherein it covers the branch 96 and directs parts to the branch 98.

Controls

Figure 6:
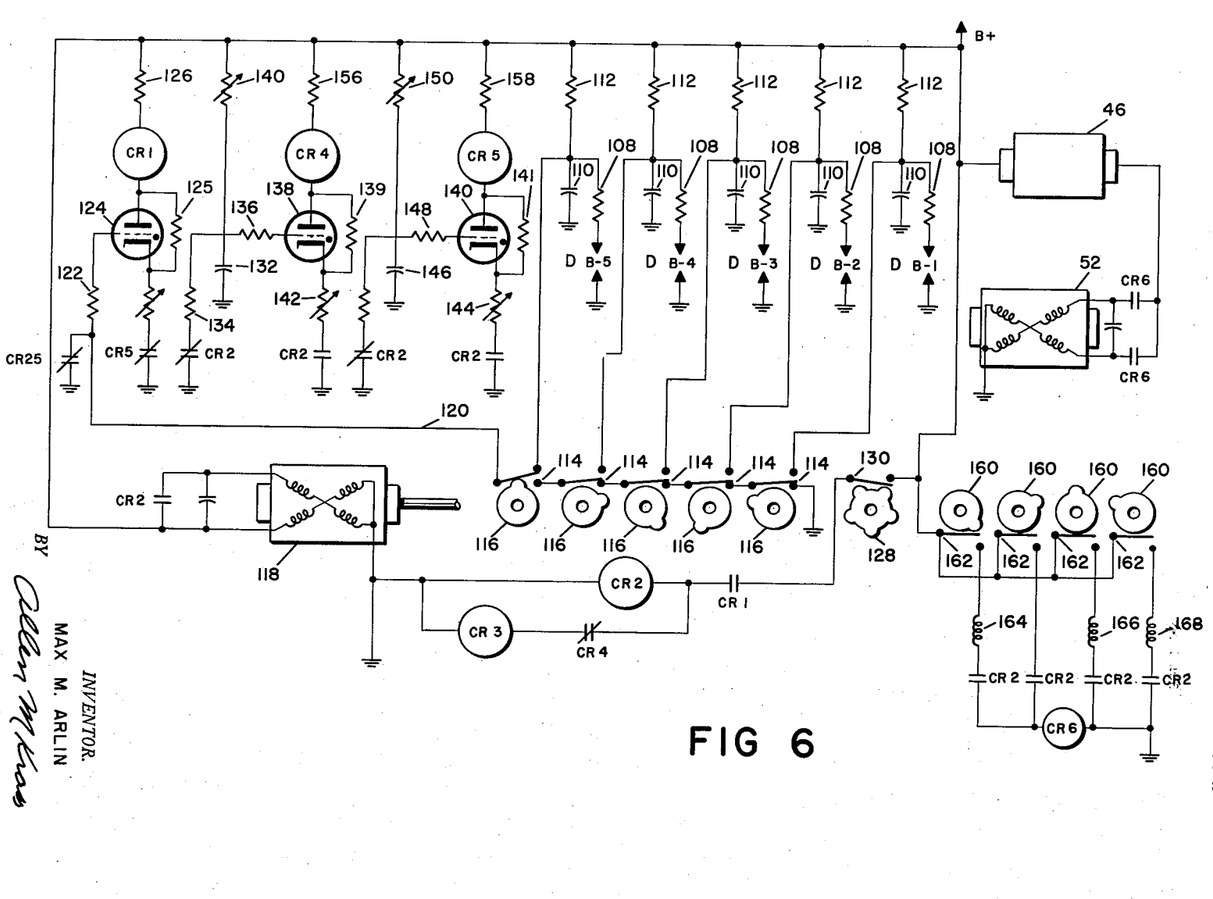
Figures 6, 7 and 8 are schematic views of the electronic circuitry which controls the apparatus of the preferred embodiment.
Figure 7:
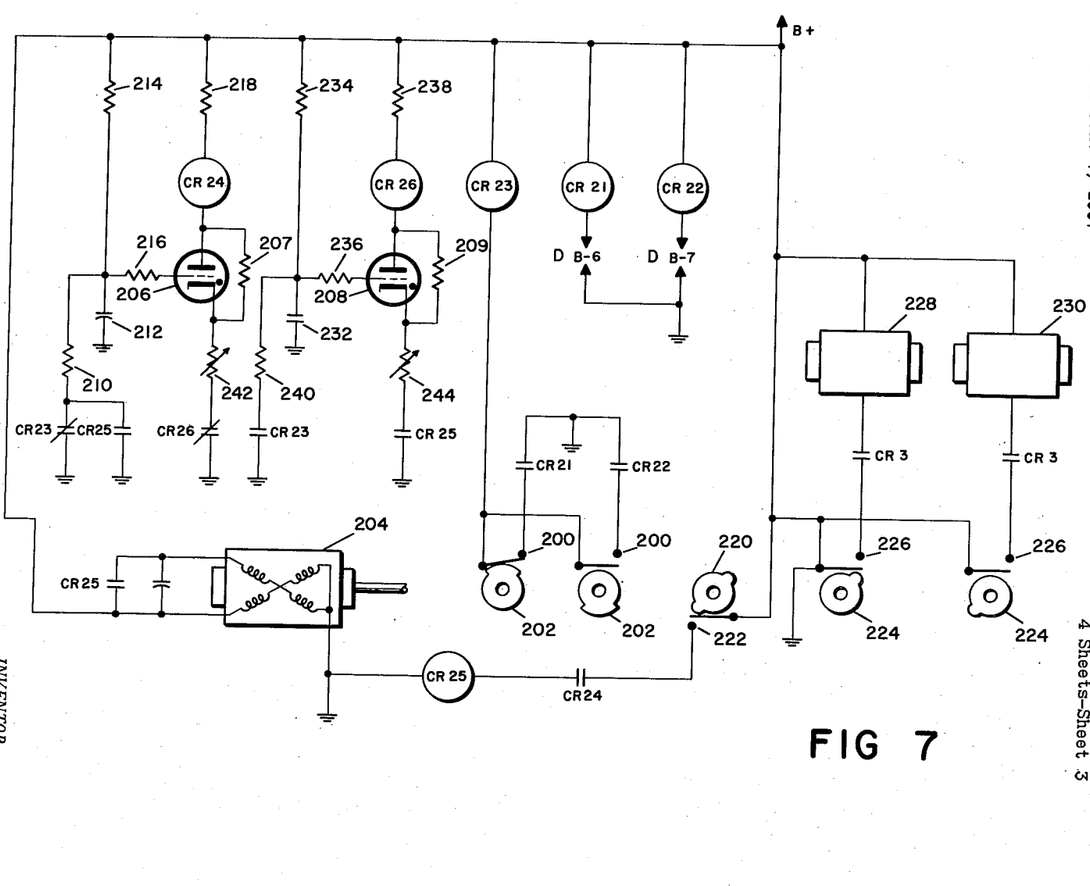
Figure 8:
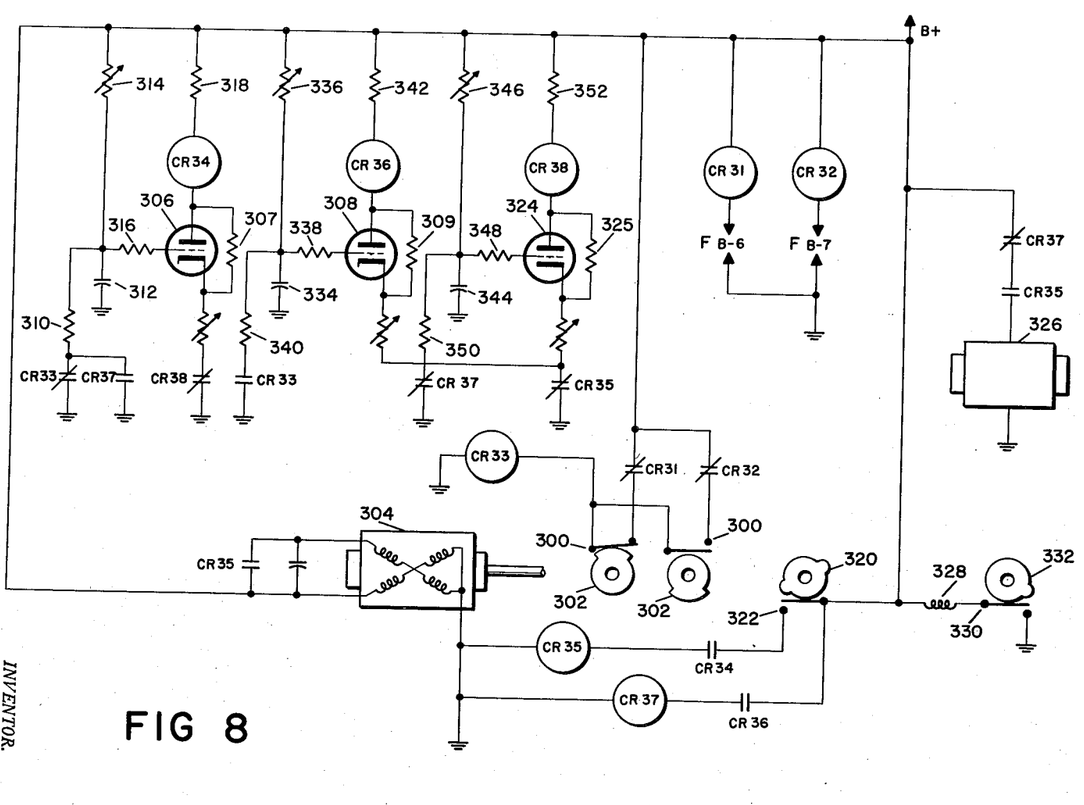

The control system for the material handling equipment is shown schematically in Figures 5, 6, and 7. Figure 6 generally comprises the control means for scanning the rotary hoppers 22 to determine whether they require additional parts and for controlling the parts flow so as to add a fixed amount of parts to any of the hoppers 22 that do require parts. Figure 7 generally comprises the means for determining which of the storage hoppers, B6 or B7 should be used to feed parts to the rotary hopper 22. Figure 8 generally comprises a control circuit for determining which of the storage hoppers B6 or B7 should be fed from the floor hopper, B8. The three figures together constitute a completed system for controlling the feeding of the rotary hoppers B1, B2, B3, B4, B5. The rotary hopper A1 is fed from the storage hopper A2 by a system which is by nature much simpler and will be apparent from a consideration of the "B" system.

Referring to Figure 2 each of the rotary hoppers 22 has a rod support 100 attached to the inner surface of its bowl 26 at the bowl's highest vertical point. The rod holder adjustably supports a length of steel rod 102 by means of an adjustable screw 104. The vertical position of the rod 102 may therefore be adjusted within the rod holder 100. At its lower end the rod 102 may carry a short section of electrically conductive chain 106. The chain hangs into the area of the bowl 26 that is normally filled with work pieces 20.

The rod support 100 is maintained in an insulated relationship with respect to the main portion of the bowl 26. However, when the chain touches work pieces 20 which are contained in the bowl 26 the entire rod holder circuit is shorted out to the bowl 26; therefore, the chain 106 and its associated support form a detector which indicates when the level of parts in the hopper 22 has passed below a certain value. The chain 106 and its supporting rod 102 may be adjusted within the rod holder 100 to vary the level of parts at which the detector becomes operative. The entire chain assembly will therefore be referred to as a detector.

In Figure 6 the detectors associated with each of the machines B1, B2, B3, B4 and B5 are designated DB1, DB2, DB3, DB4 and DB5 respectively. One end of each of the detectors is connected to the ground of the system which represents the negative terminal of a common power supply. The other end of each of the detectors is connected to a resistor 108 which feeds a capacitor 110 that has its other terminal grounded. The common terminals of the resistors 108 and the capacitors 110 are each connected through additional resistors 112 to the positive side of the common power supply. When a sufficient quantity of parts for the purposes of the present device are present in the hoppers 22 its associated detector device DB1, DB2, DB3, DB4 or DB5 is in a shorted position, and therefore the associated capacitor 110 is grounded at both ends so that no charge can build upon it. However, when the parts level in any of the rotary hoppers 22 becomes so low that its associated detector chain 106 no longer makes contact with the parts in the hopper bowl 26 the detector becomes open circuited and its associated capacitor 110 begins to charge through the resistor 112.

Each of the positive terminals of the capacitors 110 is also connected to the normally open terminal of a cam driven single pole double throw switch 114. The switches 114 are intermittently actuated sequentially to close their normally open contacts by cams 116 which are driven by an electric motor 118 which has a quick stop or plugging connection. Each of the five cams 116 has its single lobe separated from the adjacent cam by 72°. Thus, for every single rotation of the motor 118 each of the cams 116 sequentially engages its switch 114. The normally closed contacts of the switches 114 are so connected as to connect that single switch which may be opened at any given cam position to the line 120 which connects through a resistance 122 to the grid of a gas filled vacuum tube 124 which may be the thyratron type.

Thyratron tubes have two states of operation. The tube may be triggered from the non-conductive to the conductive state by the application of a pulse of sufficient voltage to its grid. In order to return the tube to the non-conductive state it is necessary to unground the tubes cathode. A resistor 125 which is connected between the plate and cathode of tube 124 biases the cathode. If a sufficient voltage build up has occurred across the capacitors 110 as a result of their associated detector mechanism being open when the appropriate point in the revolution of the motor 118 is reached, that voltage will be communicated through one of the switches 114 and the line 120 to the grid of the vacuum tube 124 causing it to fire or assume a conductive condition. Momentary openings of the detectors will not allow sufficient voltage build up in the time delay circuits of the capacitors 110 to fire the tube 124. The tubes firing will cause the control relay CR1 to be actuated. In all the schematic electrical diagrams the control relays are shown disassociated from their contacts. The coils of the relay are shown by a circle while the contacts of the relay are shown by a pair of parallel bars which may have a diagonal line through them if they are normally closed.

When the tube 124 fires, the coil of relay CR1 becomes energized through a resistor 126 which is connected to the positive terminal of a common power supply. The relay CR1 has a single normally open contact disposed in series with another cam 128 which is also driven by the motor 118. This cam 128 has five lobes which are so positioned as to cause a normally opened single pole switch 130 to close at intervals between the closings of the cams 116. The sequence of operations is therefore as follows: One of the cams 116 closes and dwells for approximately 10°; then it opens and one of the lobes of cams 128 closes and dwells for approximately 10°; 72° after the first cam 116 closed the second cam 116 closes and dwells for 10° which is followed by another closing of the cam 128, another closing of the cam 116, etc.

After the contacts of relay CR1 have closed as a result of the firing of the tube 124 the motor 118 therefore continues to rotate until the next lobe of the cam 128 closes the switch 130. That action connects the contacts of relay CR1 to the positive terminal of the common power supply and therefore energizes the coils of both relays CR2 and CR3.

One set of the contacts of CR2 is connected across the plugging windings of the motor 118 so that their closing stops the motor.

The motor 118 is therefore not stopped until the time delay capacitor 110 which initially caused the firing of the tube 124 is removed from the grid circuit of that tube by the opening of its associated cam driven switch 114. This action prevents the tube from refiring during the operation of the feeding cycle. Another normally closed set of the contacts of the relay CR2 are connected across a time delay circuit which comprises a capacitor 132, a resistor 134 which is connected to the contacts of the relay CR2, and another resistor 136 which is connected to the grid of a thyratron tube 138. The tube 138 is biased by a resistor 139. When the normally closed contacts of CR2 open as a result of the actuation of CR2 the capacitor 132 begins to charge through a variable resistor 140 which is connected to the positive terminal of the common power supply. When the voltage across 132 has reached a certain value the tube 138 will fire. However, before that is discussed certain other actions which take place upon the energizing of relays CR2 and CR3 bear discussion.

Normally open contacts of the relay of CR2 are disposed in the cathode circuits of the tube 138 and of another thyratron 140 which is biased by a resistor 141. These contacts are connected to ground through variable resistors 142 and 144. The actuation of CR2 closes these contacts and places the tubes in proper condition to fire.

Another normally closed contact of relay CR2 is connected in the grid circuit of the tube 138 to another time delay circuit comprising a capacitor 146, a resistor 148 which connects the grid of the tube 140, and a variable resistance 150 which acts to charge the capacitor 146 upon the closing of the relay CR2. The position of the variable resistances 140 and 150 are so adjusted that the tube 138 always fires before the tube 140.

The relay CR3 which closes at the same time as relay CR2 energizes either of motors 152 or 154 depending upon the condition of the circuity shown in Figure 7. The motor 152 powers the elevator of the storage hopper B6 while the motor 154 powers the elevator storage hopper B7. Therefore, upon the firing of tube 124 one of the storage hoppers B6 or B7 begins to feed parts on to the conveyor belt 50. As soon as the capacitor 132 accumulates a sufficient charge tube 138 fires energizing the control relay CR4 through the resistance 156 which is connected to the positive terminal of the common power supply. This opens the normally closed terminals of the relay CR4 which are in series with the coil of the control relay CR3 and therefore shuts off whichever of the motors 152 or 154 is energized. It is therefore apparent that the length of time which the storage hopper motors are energized, and therefore the number of work pieces that are deposited upon the conveyor 150 is dependent upon the position of the variable resistance 140.

Sometime after the tube 138 fires the capacitor 136 builds up to a sufficient charge to fire the tube 140 and energize the coil of control relay CR5 through the resistance 158. Upon being energized CR5 opens the cathode of the first thyratron 124 and therefore returns that tube to a non-conductive position. This action opens the coil of relay CR1 and in turn de-energized the relay CR2 returning the circuit to a normal inoperative position. The reason for the time delay between the actuation of the tube 138 and that of the tube 140 is to allow all the parts which are fed to the conveyor 50 by the storage hoppers to reach their proper rotary hopper 22 before the circuit becomes operative again and detects another empty rotary hopper.

Another group of four cams 160 is also driven by the shaft of the motor 118. These four cams actuate single pole single throw normally open switches 162 at regular intervals that coincide with four of the points at which one of the cams 128 closes one of the switches 114. Therefore when the motor 118 is stopped as a result of the actuation of the coil of relay CR2 after the closing of one of the lobes of cam 128 four out of five times one of the cams 162 will also be closed. Three of the switches 162 are so connected as to energize a gate when closed. The coil 164 actuates the gate 70, the coil 166 actuates the gate 162, and the gate 168 actuates the gate 60. The particular gates are so associated with the lobes 160 that the particular gate is energized which is associated with the detector 108 that is open. When the detectors which are associated the machines B1 or B4 are actuated no associated gate is energized since the hoppers 22 which are associated with these machines receive all the parts that get as far as them on their respective conveyors. A cam is associated with the detector connected to machine B4 to affect the reversing of the conveyor 50 as is described immediately hereafter but no such cam is associated with the detector connected to the machine B1. The coil of the control relay CR6 is so connected that the closing of either of any of 3 of the switches 162 will cause it to be energized providing that the relay CR2 is also actuated. These three switches are associated with the machines B3, B4 and B5. The control relay CR6 is associated with the motor 52 so as to cause the motor to reverse, the motor 52 controlling the conveyor 50. When the relay CR6 is not actuated it drives the conveyor to the left as viewed in Figure 3. When the relay CR6 is actuated it reverses the motor 52 to the drive conveyor 50 to the right.

Therefore the operation of the detector scanning mechanism and the gate operating mechanism of Figure 6 may be summarized as follows: The motor 118 normally rotates the cams 116 so as to connect the various detector unit 113 to the grid of the tube 124 in a successive manner. When one of the detectors 108 becomes open as a result of a shortage of parts in its associated rotary hopper 22 a charge appears on the capacitor 110 associated with that detector 108. When this detector is scanned if the charge has built up to a sufficient value it fires tube 124 which causes the relay CR2 and CR3 to be energized as soon as the next lobe on cam 128 falls into position. This is necessary so as to allow the detector which initiated the firing of the tube 104 to be removed from the grid circuit of that tube so that it will not continue the operation of the circuit after it has started to receive parts. Actuation of CR3 starts the flow of parts to the particular rotary hopper 22 which is empty and also begins the operation of a time delay circuit which fires the tube 138 after a particular length of time. The flow of parts from the storage hopper is then stopped, but the circuit remains operative for future time delay until the tube 140 fires. The circuit then returns to a normal position. In the meantime upon the actuation of control relay CR2 a particular gate which is associated with one of the rotary hoppers has been opened, if such hopper requires a gate and the direction of the conveyor 50 has been reversed if necessary to carry the parts to that particular conveyor.

*Storage hopper selector*

Referring to Figure 7 the next problem which the logical circuity must solve is which of the storage hoppers B6 or B7 should feed to the rotary hoppers as they become empty. For the purposes of the circuit, it is permissible to feed from either of the hoppers B6 or B7 as long as a certain minimum quantity of parts is contained in the hopper. The plates 86 which are disposed in insulated relationship in the bottoms of the hoppers B6 and B7 are used to detect the presence of this minimum quantity of parts. Referring to Figure 7, the plate 86 in the storage hopper B6, referred to as DB6 while the equivalent plate in the storage hopper B7 is referred to as DB7.

When a minimum quantity of parts is present in the detectors, they are shorted to ground. When this occurs, the control relays CR21 and CR22 which are disposed in series with the detectors DB6 and DB7 and having their other ends connected to the positive terminal of the common power supply, are actuated.

Each of the relays CR21 and CR22 has a set of normal contacts which have one of their ends grounded, the other ends connected in series with normally open switches 200. The switches 200 are intermittently closed by cams 202, which are rotated by a motor 204. The other ends of the switches 200 are connected to the coil of a relay CR23 which has its other terminal connected to the positive and to the power supply. Therefore, initially motor 204 rotates the cams 202 which sequentially close the switches 200. When one of the detectors GB6 or GB7 detects a minimum quantity of parts in its storage hopper it closes its associated relay CR21 or CR22. When the cam 202, which is associated with the normally open contact of the relay so closed is actuated by the cam 202 it closes the circuit of the coil of control relay 23 to ground. The control relay 23 has a set of normally closed contacts in the grid circuit of thyratron tube 206 which is biased by resistor 207 and a pair of normally open contacts in the grid circuit of thyratron tube 208. The tube 208 is biased by a plate-cathode resistor 207. The normally closed contacts CR23 and the grid circuit of the tube 206 normally ground a resistor 210 so as to short out a capacitor 212 which is connected to B plus through a resistance 214 and is connected to the grid of tube 206 through another resistance 216. When the normally closed contact of CR23 opens, the condenser 212 begins to charge through the resistance 214. When it has reached a certain value, the tube 206 fires actuating the coil of control relay 24 which is connected to B plus through a resistance 218. Pair of normally open contacts with relay CR24 are disposed in series with a cam 220 that is joined by the motor 204 and with a coil of relay CR25. The lobes on the cam 220 are so designed as to actuate its normally open switch 222 just before the lobe of the cam 202 which initiated the firing of the tube 206 becomes open.

Control relay CR25 has a pair of normally open contacts which stop the rotation of the motor 204 and a second pair of normally open contacts which close the cathode circuit of the tube 208. Another set of cams 224 are also driven by the motor 204. These cams control normally open switches 226 which connect either motor 228 which powers the hopper B6 or motor 230 which powers the hopper B7. The connection to the motors 228 and 230 are made through the normally open contacts of CR3 so that the motors are only energized when the circuit of Figure 6 operates the controls so as to feed parts to a particular rotary hopper 22. The two cams 224 have lobes which correspond with the lobes on cam 220, therefore one of the switches 226 is closed upon the actuation of detector DB6 while the other switch 226 which is closed upon the actuation of the circuit by the detector DB7.

The circuit therefore remains in this condition until the detector DB6 or DB7 which originally initiated the action opens up because a lack of parts in its associated hopper. When this occurs the relay CR21 or the relay CR22 opens its contacts series with one of the switches 200 and D actuates the control relay CR23. This action opens the contacts of CR23 in the grid circuit of tube 208, allowing the capacitor 232 to begin to charge through resistor 234 so as to fire the grid of the tube 208 through the resistor 236. When this occurs the control relay CR26 is actuated through resistor 238 and the cam of the tube 206 is opened returning the tube to a non-conducting condition. This actuates CR24 which in turn controls CR25 to begin the rotation of the motor 204 again and to open the contacts of control relay CR25 in the grid circuit of the tube 206. It is to be noted that the circuit of Figure 7 differs essentially from the figure of circuit 6 in that it remains actuated not for a fixed length of time which is determined by a time delay circuit, but rather for as long as the detector which initiated its action remains in a closed position. That is assuming that originally the detector DB6 initiated the action of the circuit by closing its control relay CR21 and therefore actuating its relay CR23 when the cam 202 was in a proper position, the circuit will remain operative until the detector DB6 remains open for a period of time which is equal to the time delay across the capacitor 232. The time delay of the capacitor 232 and its associated resistors 236 and 240 assures that the opening of a detector DB6 is caused by an absence of parts and not a momentary discontinuity. The time delays which must be had before the tubes 206 and 208 fire may be controlled by variable resistors 242 and 244 in their respective cathode circuits. By comparing these resistances the voltage at the grid which is required to fire the tubes is varied.

The relative positions of the lobes and cams 220 and 202 are such that the cam 220 actuates while the lobe of 202 which initiated the firing action is still engaged. This is necessary so that the particular detector circuit which initiated the firing of the circuit will remain in the circuit until it opens up. The lobes of the cam 220 are initiated just before the end of the initiating lobe on the cam 202. Therefore, a particular detector will not initiate the circuit twice in a row without its companion detector having been scanned.

*Storage hopper feed selector*

The next problem which the logical control circuitry must solve is which of the storage hoppers B6 or B7 should be fed to. For the purposes of the circuit it is acceptable to feed to either hopper as long as it is not full. The detectors which determine the hopper B6 can be 7 also consists of a rail 160 which runs around the top of the hoppers. The rail is itself conductive but is supported in insulated relationship with respect to the hopper base 78. A gap of approximately ½″ exists between the bottom of the rail 160 and the top of the hopper 78. Therefore when the hopper is full the conductive parts short the rail 160 to the hopper body 78 so as to indicate the fullness of the hopper.

Referring to Figure 8 the detectors B6 and B7 are referred to as FB6 and FB7 they are connected in series with control relays CR31 and CR32 respectively. The other ends of the relays CR31 and CR32 are connected to the positive terminal of the common power supply. Therefore, when the detector FB6 or detector FB7 is closed so as to indicate that its associated hopper is full the associated control relay CR31 or CR32 has its coil energized. The relays CR31 and CR32 are connected through normally open switches 300 to the coil of control relay CR33. The other end of relay CR33 is grounded and the contacts of CR31 and CR32 are connected to the positive terminal of the power supply. The circuit is designed to operate when the hopper is not full and therefore when CR31 or CR32 is open its associated contacts are closed. The switches 300 are sequentially and periodically actuated to a closed position by the cams 302 which are driven by motor 304. When one of the switches 300 is closed and its associated relay terminals are closed the control relay CR33 is actuated. In a matter identical to that of Figure 7 the control relay CR33 has a normally closed contact in the grid circuit of the thyratron tube 306 and a normally open pair of contacts in the grid circuit of thyratron 308. The tubes are biased by resistors 307 and 309 respectively. The normally closed contacts ground a resistor 310 which operates through the RC circuit comprising a capacitor 312, a variable resistor 314 which is connected to the positive terminal power supply, and a resistor 316 which is connected to the grid of the tube 306. Therefore when the control relay CR33 is actuated opening the RC circuit the capacitor 312 begins to charge through the resistor 314. When a particular voltage is reached the grid of tube 306 is brought to a point where the tube fires from a non-conductive position to a conductive condition. This actuates a control of coil control 334 which is connected in the point circuit of the thyratron 306 and connected to the positive terminal of the power supply through a resistor 318. The control relay CR34 has a pair of normally open contacts disposed in series with the coil of relay CR35 and another cam 320 which is also driven by the motor 320. The lobes of cam 320 are so positioned as to actuate the switch 322 near the end of a period of dwell of the lobes and of the cams 302. When this occurs the control relay 35 is energized and it closes the normally open contact stopping the motor 334. It also opens its normally closed contacts which ground the cathodes of the thyratron 308 and another thyratron 334. The closing of the CR35 also energized a motor 326 which powers the floor hopper B8. Referring to Figure 3 these parts flow into the conduit 94 and from there into the branch 96 unless an actuated coil 328 which is in series with normally open switch 330 is energized by the closing of the switch 330. The switch 330 is closed by a cam 332 which is also driven by the motor 334. The cam is in a closed position whenever the circuit has been actuated by the detector FB7.

The circuit remains in this condition until the detector which actuated the circuit FB6 or FB7 becomes closed as a result of its hopper filling up with parts. When this occurs the associated relay CR31 or CR32 is actuated opening its normally closed contact. This de-energizes the relay CR33 thereby opening the grid circuit of the thyratron 308 and starting the action of the time delay which consists of a capacitor 334 a variable resistor 336 which connects to the positive terminal of the common power supply a resistor 338 which connects to the grid of the tube 308 and the resistor 340 which connects to ground. When a sufficient charge is built up across the resistor 334 it fires the grid of the tube 308 actuating the coil of relay CR36 which is disposed in the plate circuit of 308 in series with the resistor 342 which connects to the positive terminal power supply. Relay CR36 closes its normally open contacts which are in series with control relay CR37. CR37 open its normally closed contact in the circuit of motor 326 stopping the full parts to the hoppers. It also opens its normally closed contact in the grid circuit of the thyratron 324 starting the action of a time delay circuit which comprises a capacitor 344 a variable resistor 346 which feeds the capacitor 344 from the common power supply a resistor 348 which connects to the grid of the tube 324 and the resistor 350 which connects to the ground. When this time delay is expired the tube 324 fires energizing the relay CR38 to a resistor 352 which connects to the positive terminal common power supply. CR48 opens the normally closed contacts in the cathode circuit of the tube 306 returning the tube to a non-conduction condition.

It is therefore seen that the operation of the circuit of Figure 8 is essentially similar to the operation of the circuit of Figure 7, differing in two major points. First: The detectors initiate the action of the circuits when they are open rather than closed, and secondly an additional time delay circuit at the end of the circuit's operation prevents the circuit from refiring until all the parts which are initially introduced into the conduit 94 have been carried to the particular hopper to which they are assigned.

Having thus described my invention I claim:

1. In a material handling system having a first material storage unit, material output means for said first unit, a second material storage unit, and a material conveying means connecting said material output means of said first storage unit to said second storage unit, means for maintaining a full quantity of material in said second storage unit which comprises; a first time delay circuit; means for energizing said first time delay circuit at such times as said second storage unit is not in a full condition; a first relay adapted to be energized upon the voltage buildup of said first time delay circuit; means for actuating said conveying means and said output means upon the energizing of said first relay; a second time delay circuit adapted to be energized upon the energizing of said first relay; a second relay adapted to be energized upon the voltage buildup of said second time relay circuit; means for halting said output means upon the energizing of said second relay; a third time delay circuit adapted to be energized upon the energizing of said second relay; a third relay adapted to be energized upon the energizing of said third time delay circuit; and means for de-energizing said material conveying means upon the de-energizing said third relay.

2. A material handling system comprising in combination: a plurality of first material storage units; a plurality of second material storage units; a third material storage unit; a first material conveyor device having inputs from each of said second material storage units and having outputs to each of said first material storage units; a second material conveying device having an input from said third storage unit and having outputs to each of said second material storage units; first detector means associated with each of said first material storage units for determining when the material level in said first storage unit falls below a predetermined quantity; means for continually scanning said first detector means to locate one of said detectors which is in a condition that indicates that the parts level in its associated storage unit has fallen below a certain quantity; second detector units associated with each said second material storage units and operative to indicate when the material level in said second storage units is above a certain minimum predetermined quantity; means for scanning said second detector units to locate one of said detector units which is in such a state to indicate that the parts level in that unit is above a certain minimum quantity; means for operating said first conveyor means to carry a discrete quantity of parts from the second storage unit so selected to the first material storage unit so selected; third detector means associated with each of said second material storage units and arranged to be operative at such times as the parts level in said second material storage units falls below a predetermined minimum quantity; scanning means for determining which of said third detector means is in an operative condition; and means for feeding parts from said third material storage unit so selected to the second material storage unit so selected during such times as the third detector associated with that second storage unit in an operative condition.

3. In a material handling system having a first material storage unit, a second material storage unit, a conveyor so disposed as to carry material from said first storage unit to said second storage unit, and a delivery device operable to deposit material from said first storage unit onto said conveyor means for maintaining the quantity of material in said second storage unit at an approximate value which comprises: A detector for indicating when the quantity of material in said second storage unit is less than a predetermined value; a first time delay circuit which is actuated by said detector; a first relay connected so as to be actuated by said first time delay circuit and operative to energize said delivery device and said conveyor; a second time delay circuit connected to be actuated by the opening of said detector and which is operable to deenergize said delivery device; a third time delay circuit connected to be actuated by the operation of said second time delay circuit; and means operable upon the voltage build-up in said third time delay circuit for deactuating conveying means.

4. In a material handling system having a first material storage unit, a second material storage unit, a conveyor so disposed as to carry material from said first storage unit to said second storage unit, and a delivery device operable to deposit material from said first storage unit onto said conveyor, means for maintaining quantities of material in said second storage unit at an approximate predetermined value which comprises: A first time delay circuit; means for actuating said first time delay circuit when the quantity of material in said second storage unit is less than a predetermined value; means for actuating said delivery device and said conveying device upon the voltage build-up in said first time delay circuit; a second time delay circuit arranged to be energized when the quantity of material in said second storage unit is greater than a predetermined value; means actuated by the voltage build-up of said second time delay circuit for halting the action of said delivery device; a third time delay circuit arranged to be actuated by the voltage build-up in said second time delay circuit; and means operative upon the buildup of voltage in said third time delay circuit for halting the operation of said conveying means.

5. In a material handling system having a first material storage unit, a second material storage unit, a conveyor so disposed as to carry material from said first storage unit to said second storage unit, and a delivery device operable to deposit material from said first storage unit on to said conveyor, means for maintaining quantities of material in said second storage unit at an approximate predetermined level which comprises: a first time delay circuit; means for actuating said first time delay circuit when the quantity of material in said second storage unit is less than a predetermined value; means for actuating said delivery device so as to deposit a predetermined quantity of material upon said conveying device upon the voltage build-up in said first time delay circuit; means for actuating said conveying device upon the voltage build-up in said first time delay circuit; a second time delay circuit arranged to be energized when a quantity of material in said second storage unit is greater than a predetermined value; and means actuated by the voltage build-up of said second time delay circuit for halting the operation of said conveying means.

6. A material handling system comprising in combination: a plurality of first material storage units; a plurality of second material storage units; a first material conveyor device having the inputs from each of said second material storage units and having outputs at each said first material storage units; first detector means associated with each of said first material storage units for determining when the material level in said first storage unit falls below predetermined quantity; means for continually scanning said first detector means to locate one of said detectors which is in a condition that the part level and its associated storage unit has fallen below a certain quantity; second detector units associated with each of said second material storage units and operative to indicate when the material level in said second storage units is above a certain minimum of predetermined quantity; means for scanning said second detector units to locate one of said units which is in such a state to indicate that the parts level in that unit is above a certain minimum quantity; means for operating said first conveyor to carry a discrete quantity of parts from said second storage units so selected to the first material storage units so selected; and means for maintaining said first conveyor in operation for a sufficient time to assure the arrival of the discrete quantity of parts to said first storage unit.

7. A material handling system comprising in combination: a plurality of first material storage units; a plurality of second material storage units; a first material conveyor device having inputs from each of said second material storage units and having outputs to each of said first material storage units; first detector means associated with each of said first material storage units for determining when the material level in said first storage unit falls below a predetermined quantity; means for continually scanning said first detector means to locate one of said detectors which is in a condition that indicates parts level and its associated storage unit has fallen below a certain quantity; second detector associated with each of said second material storage units and being operative to indicate when the material level in said second storage units is above a certain minimum predetermined quantity; a first time delay unit operative upon the selection of a first material storage unit the parts level in which it is below a certain minimum quantity and operative to actuate the second material storage unit selected as having the parts level above a minimum quantity and said first conveyor device; and a second time delay circuit, connected so as to be actuated upon the timing out of said first delay circuit, and operative to de-actuate said conveying means upon its timing out.

References Cited in the file of this patent
UNITED STATES PATENTS

| | | |
|---|---|---|
| 2,124,018 | Vogel-Jorgensen | July 19, 1938 |
| 2,221,396 | Evoy | Nov. 12, 1940 |
| 2,328,240 | Wiegard | Aug. 31, 1943 |
| 2,360,583 | Riehl | Oct. 17, 1944 |
| 2,412,137 | Fink | Dec. 3, 1946 |
| 2,415,328 | Andersen et al. | Feb. 4, 1947 |
| 2,430,407 | Nelson | Nov. 4, 1947 |
| 2,470,922 | Dunn | May 24, 1949 |
| 2,552,930 | Booth et al. | May 15, 1951 |
| 2,618,395 | Brabander | Nov. 18, 1952 |